US010397888B2

(12) United States Patent
Zhang et al.

(10) Patent No.: US 10,397,888 B2
(45) Date of Patent: Aug. 27, 2019

(54) PRECODED CSI-RS FOR PHASE SYNCHRONIZATION FOR RECIPROCITY-BASED COMP JOINT TRANSMISSION

(71) Applicant: QUALCOMM Incorporated, San Diego, CA (US)

(72) Inventors: Xiaoxia Zhang, San Diego, CA (US); Zhifei Fan, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/725,811

(22) Filed: Oct. 5, 2017

(65) Prior Publication Data

US 2018/0302866 A1 Oct. 18, 2018

Related U.S. Application Data

(60) Provisional application No. 62/486,891, filed on Apr. 18, 2017.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0035* (2013.01); *H04L 5/0048* (2013.01);
(Continued)

(58) Field of Classification Search
None
See application file for complete search history.

(56) References Cited

U.S. PATENT DOCUMENTS 9,420,553 B2 * 8/2016 Park .................... H04L 5/0048
2012/0327876 A1 * 12/2012 Ouchi .................. H04B 1/713 370/329
(Continued)

FOREIGN PATENT DOCUMENTS

WO WO-2013109084 A1 7/2013

OTHER PUBLICATIONS

International Search Report and Written Opinion—PCT/US2018/024302—ISA/EPO—dated Jul. 13, 2018.

*Primary Examiner* — Anh Ngoc M Nguyen
(74) *Attorney, Agent, or Firm* — Norton Rose Fulbright US LLP

(57) ABSTRACT

Phase compensation in a new radio (NR) coordinated multipoint (CoMP) environment is discussed. A base station may synchronize the phase between one or more additional base stations in a CoMP group serving one or more user equipments (UEs). A base station estimates an uplink channel based on a sounding reference signal (SRS) received from a given UE. The base station transmits a phase synchronization reference signal (PSRS) modulated using the uplink channel estimate. The UE can measure the phase and/or timing drift from the PSRS and then will report the compensation information for the phase and timing drift back to the base station. The base station may then use the compensation information to adjust transmission characteristics for the CoMP group.

8 Claims, 11 Drawing Sheets

(51) Int. Cl.

| | |
|---|---|
| ***H04L 25/02*** | (2006.01) |
| *H04W 88/08* | (2009.01) |
| *H04W 24/10* | (2009.01) |

(52) U.S. Cl.
CPC ......... *H04L 25/0202* (2013.01); *H04W 56/00* (2013.01); *H04W 24/10* (2013.01); *H04W 88/08* (2013.01)

(56) References Cited

U.S. PATENT DOCUMENTS

| | | | | |
|---|---|---|---|---|
| 2013/0195086 | A1 | 8/2013 | Xu et al. | |
| 2014/0016620 | A1 | 1/2014 | Singh et al. | |
| 2014/0226640 | A1 | 8/2014 | Zhu et al. | |
| 2016/0043781 | A1* | 2/2016 | Cho | H04L 5/0051 342/373 |
| 2016/0352398 | A1* | 12/2016 | Chen | H04B 7/0417 |

* cited by examiner

PRECODED CSI-RS FOR PHASE SYNCHRONIZATION FOR RECIPROCITY-BASED COMP JOINT TRANSMISSION

CROSS-REFERENCE TO RELATED APPLICATIONS

This application claims the benefit of U.S. Provisional Patent Application No. 62/486,891, entitled, "PRECODED CSI-RS FOR PHASE SYNCHRONIZATION FOR RECIPROCITY-BASED COMP JOINT TRANSMISSION," filed on Apr. 18, 2017, which is expressly incorporated by reference herein in its entirety.

BACKGROUND

Field

Aspects of the present disclosure relate generally to wireless communication systems, and more particularly, to pre-coded channel state information (CSI) reference signals (CSI-RS) for phase synchronization for reciprocity-based coordinated multipoint (CoMP) joint transmission operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes estimating, by a base station, an uplink channel estimate based on a sounding reference signal (SRS) received from a served UE, wherein the base station is one of a plurality of base stations in a coordinated multipoint (CoMP) group serving the served UE, transmitting, by the base station, a phase synchronization reference signal modulated using the uplink channel estimate, receiving, at the base station, phase compensation information from the served UE, wherein the phase compensation information identifies one or more of: a phase drift, and a timing drift from the served UE based on the phase synchronization reference signal, and adjusting, by the base station, transmission characteristics based on the phase compensation signal.

In an additional aspect of the disclosure, a method of wireless communication includes transmitting, by a UE, SRS to a plurality of base stations in a CoMP group serving the UE, detecting, at the UE, a phase synchronization reference signal from each of the plurality of base stations, wherein each of the phase synchronization reference signals is modulated with an uplink channel estimate between the UE and a corresponding base station of the plurality of base stations, measuring, by the UE, a phase drift for each of the phase synchronization reference signals, and reporting, by the UE, the phase drift to at least one of the plurality of base stations.

In an additional aspect of the disclosure, an apparatus configured for wireless communication includes means for estimating, by a base station, an uplink channel estimate based on a SRS received from a served UE, wherein the base station is one of a plurality of base stations in a CoMP group serving the served UE, means for transmitting, by the base station, a phase synchronization reference signal modulated using the uplink channel estimate, means for receiving, at the base station, phase compensation information from the served UE, wherein the phase compensation information identifies one or more of: a phase drift, and a timing drift from the served UE based on the phase synchronization reference signal, and means for adjusting, by the base station, transmission characteristics based on the phase compensation signal.

In an additional aspect of the disclosure, an apparatus configured for wireless communication includes means for transmitting, by a UE, SRS to a plurality of base stations in a CoMP group serving the UE, means for detecting, at the UE, a phase synchronization reference signal from each of the plurality of base stations, wherein each of the phase synchronization reference signals is modulated with an uplink channel estimate between the UE and a corresponding base station of the plurality of base stations, means for measuring, by the UE, a phase drift for each of the phase synchronization reference signals, and means for reporting, by the UE, the phase drift to at least one of the plurality of base stations.

In an additional aspect of the disclosure, a non-transitory computer-readable medium having program code recorded thereon. The program code further includes code to estimate, by a base station, an uplink channel estimate based on a SRS received from a served UE, wherein the base station is one of a plurality of base stations in a CoMP group serving the served UE, code to transmit, by the base station, a phase synchronization reference signal modulated using the uplink channel estimate, code to receive, at the base station, phase compensation information from the served UE, wherein the phase compensation information identifies one or more of: a phase drift, and a timing drift from the served UE based on the phase synchronization reference signal, and code to adjust, by the base station, transmission characteristics based on the phase compensation signal.

In an additional aspect of the disclosure, a non-transitory computer-readable medium having program code recorded thereon. The program code further includes code to transmit, by a UE, SRS to a plurality of base stations in a CoMP group serving the UE, code to detect, at the UE, a phase synchronization reference signal from each of the plurality of base stations, wherein each of the phase synchronization reference signals is modulated with an uplink channel estimate between the UE and a corresponding base station of the plurality of base stations, code to measure, by the UE, a phase drift for each of the phase synchronization reference signals, and code to report, by the UE, the phase drift to at least one of the plurality of base stations.

In an additional aspect of the disclosure, an apparatus configured for wireless communication is disclosed. The apparatus includes at least one processor, and a memory coupled to the processor. The processor is configured to estimate, by a base station, an uplink channel estimate based on a SRS received from a served UE, wherein the base station is one of a plurality of base stations in a CoMP group serving the served UE, to transmit, by the base station, a phase synchronization reference signal modulated using the uplink channel estimate, to receive, at the base station, phase compensation information from the served UE, wherein the phase compensation information identifies one or more of: a phase drift, and a timing drift from the served UE based on the phase synchronization reference signal, and to adjust, by the base station, transmission characteristics based on the phase compensation signal.

In an additional aspect of the disclosure, an apparatus configured for wireless communication is disclosed. The apparatus includes at least one processor, and a memory coupled to the processor. The processor is configured to transmit, by a UE, SRS to a plurality of base stations in a CoMP group serving the UE, to detect, at the UE, a phase synchronization reference signal from each of the plurality of base stations, wherein each of the phase synchronization reference signals is modulated with an uplink channel estimate between the UE and a corresponding base station of the plurality of base stations, to measure, by the UE, a phase drift for each of the phase synchronization reference signals, and to report, by the UE, the phase drift to at least one of the plurality of base stations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
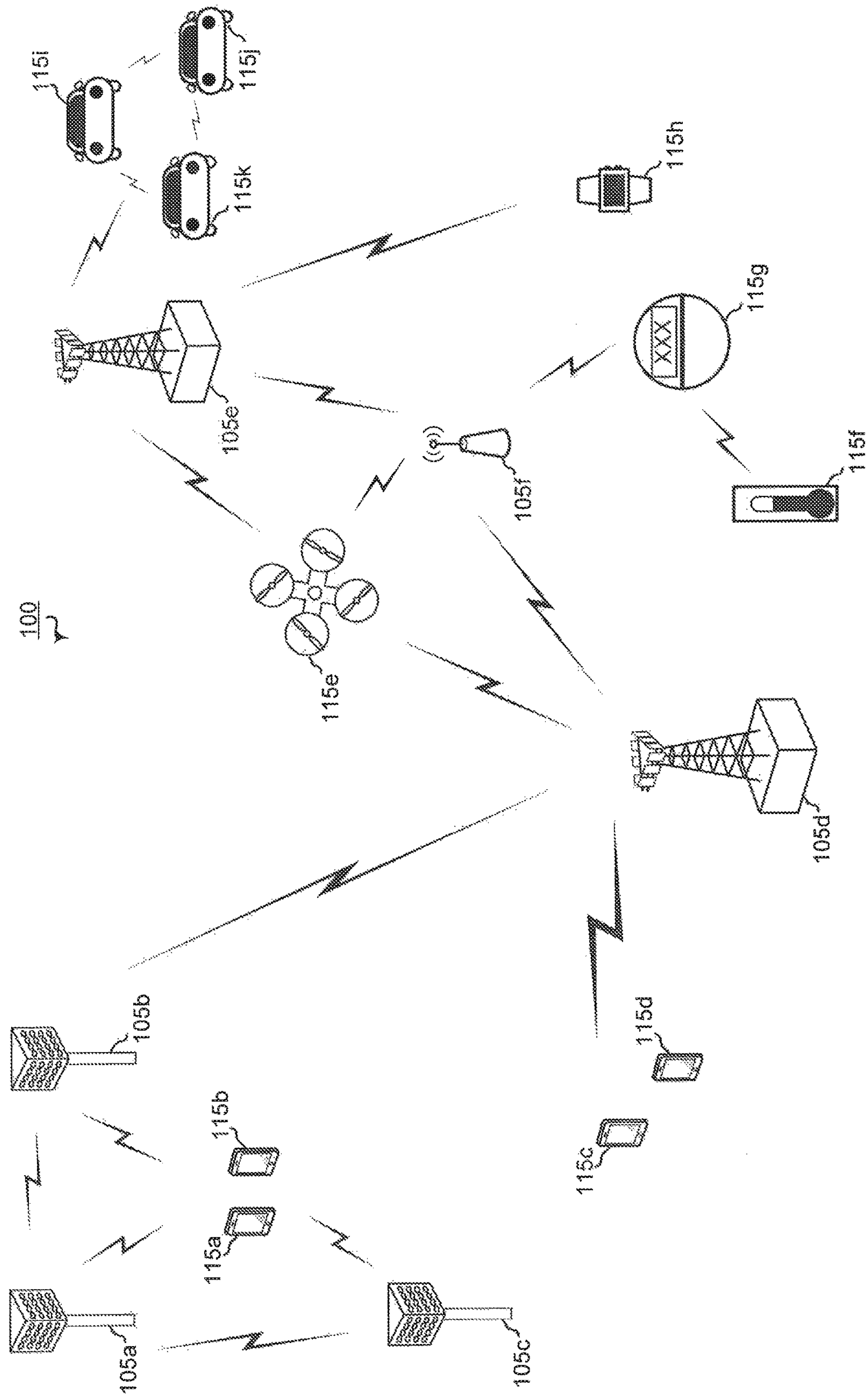
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA)

networks, frequency division multiple access (FDMA) networks, orthogonal FDMA (OFDMA) networks, single-carrier FDMA (SC-FDMA) networks, LTE networks, GSM networks, 5 Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/$kin^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
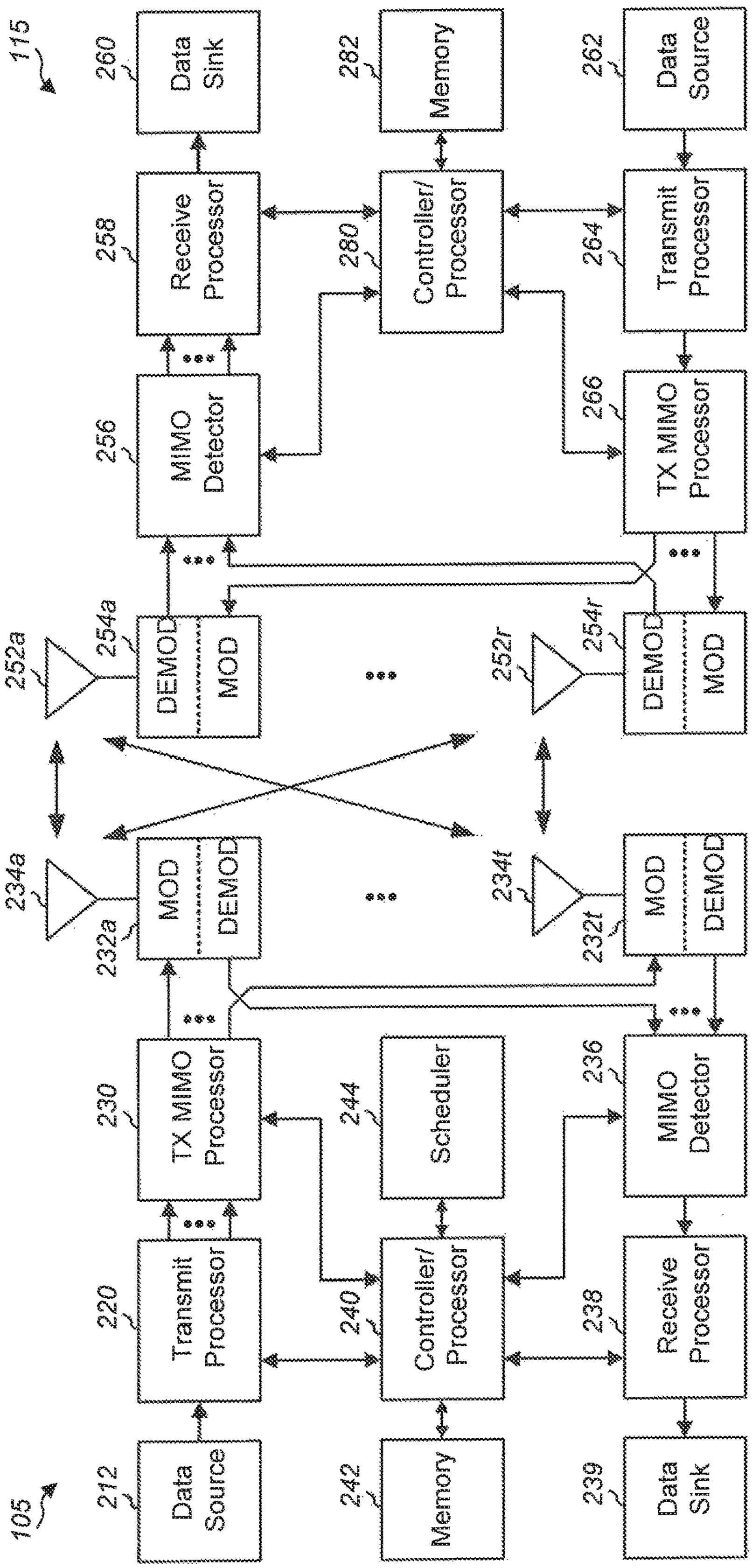
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6A and 6B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
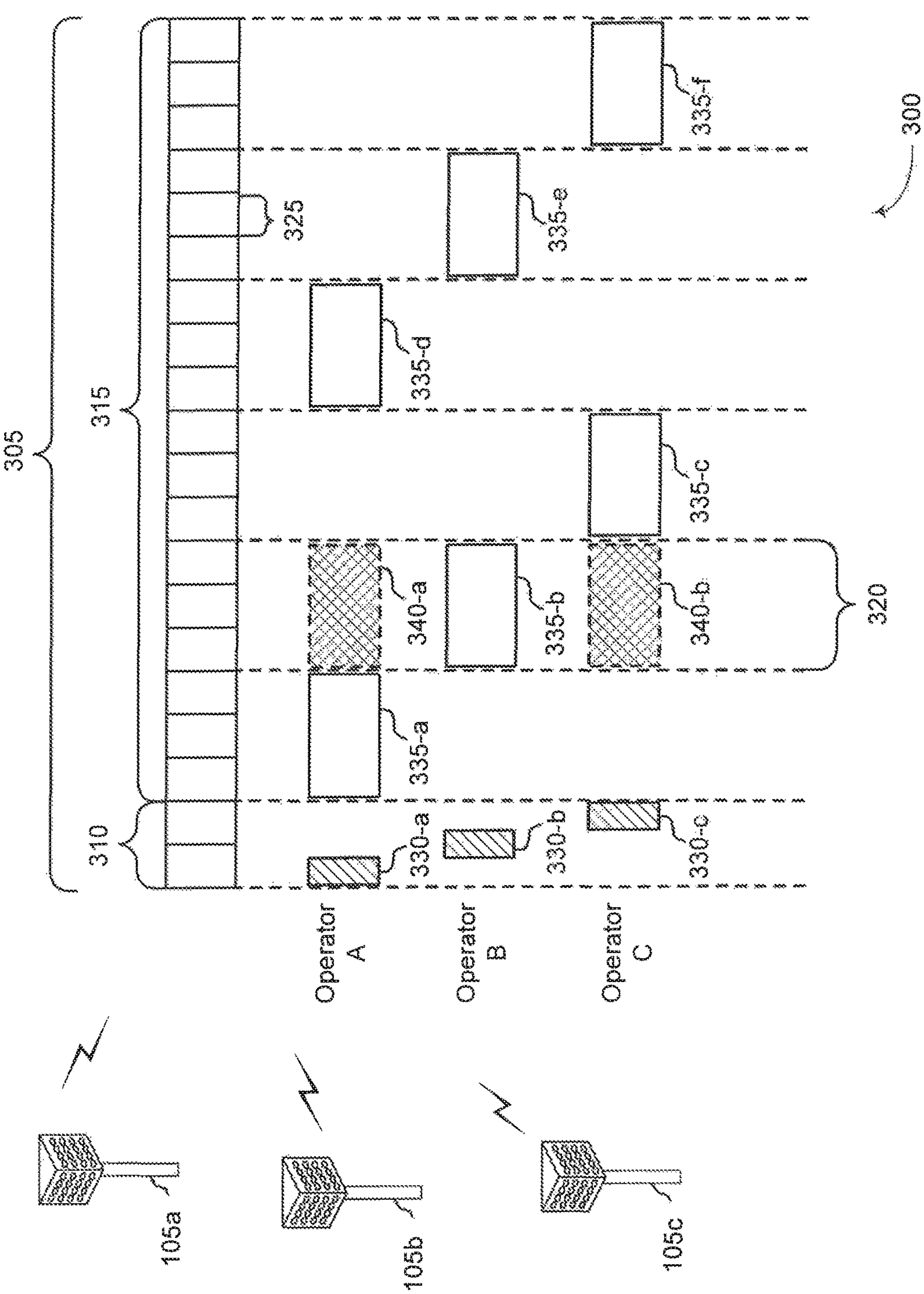
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless operations that use coordinated multipoint (CoMP) transmissions include a range of different techniques that enable the dynamic coordination of transmission and reception over a variety of different base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously process and transmitted from multiple cooperating base stations. In heterogeneous and dense small cell network scenarios with low power nodes, UEs may experience significant signal strength simultaneously from multiple base stations. In order to manage both downlink and uplink joint transmission CoMP, accurate and up-to-date channel state information (CSI) feedback is used.

Figure 4A:
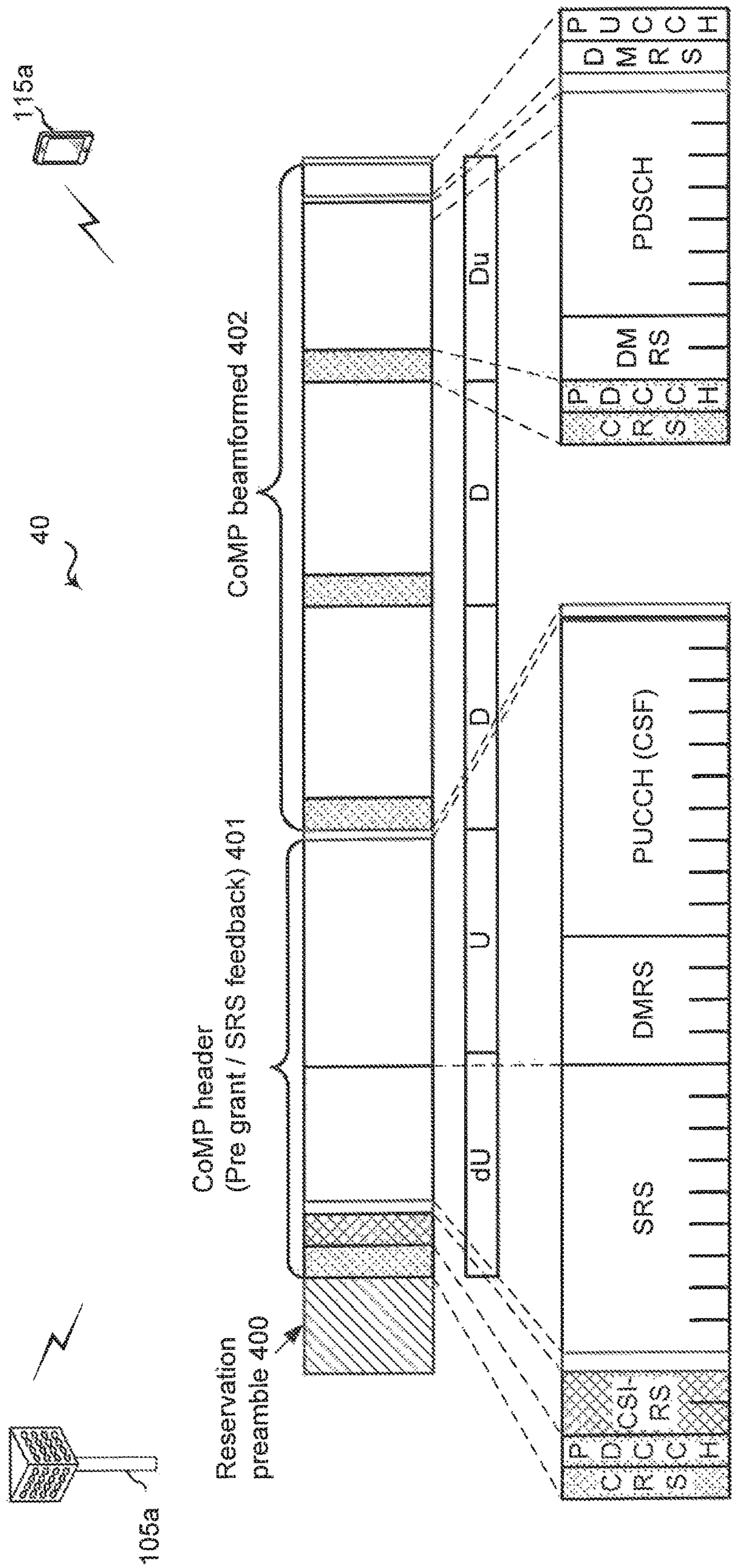
FIGS. 4A and 4B are block diagrams illustrating CoMP downlink and uplink data transmissions between a base station and UE.
Figure 4B:
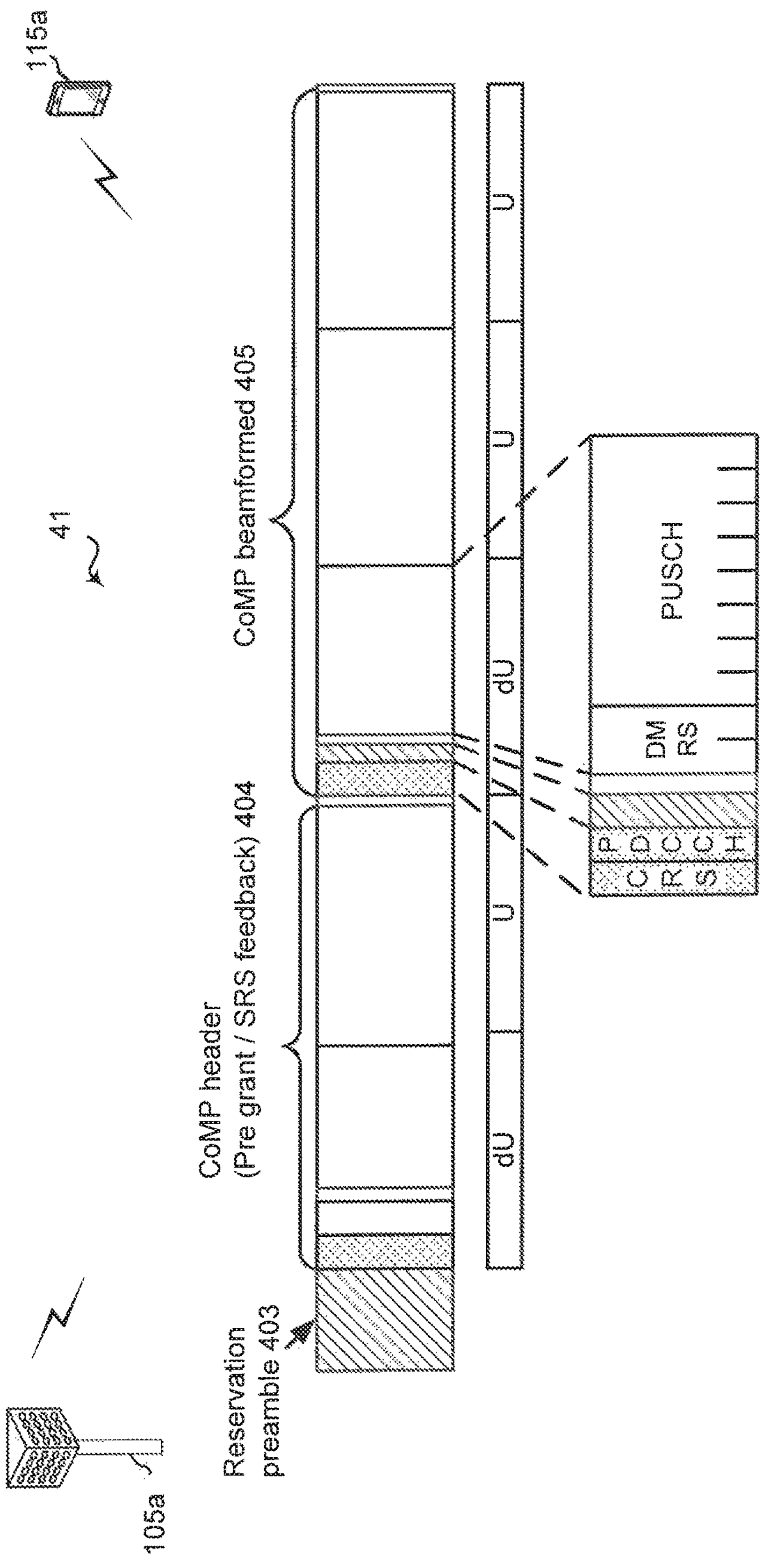

FIGS. 4A and 4B are block diagrams illustrating CoMP downlink and uplink data transmissions 40 and 41 between a base station 105*a* and UE 115*a*. Base station 105*a* and UE 115*a* participate in communications over a shared spectrum, such as according to NR-SS operations. Prior to communicating on the shared spectrum, the transmitting entity, base station 105*a* in FIG. 4A and UE 115*a* in FIG. 4B, performs an LBT procedure in reservation preambles 400 and 403. Once the channel has been secured, at the beginning of each of downlink CoMP data transmission 40 and uplink CoMP data transmission 41, sounding reference signal (SRS) feedback is transmitted by UE 115*a* within CoMP header 401 and 404. CoMP headers 401 and 404 include a downlink "pre-grant" of a SRS/channel state feedback (CSF) request, CSI-RS, along with an UL "pre-grant ACK," including the SRS and CSF (PUCCH) response to the request. The uplink CoMP operation is reciprocal to the downlink CoMP operation. Remote transmission points communicate in-phase and quadrature (I/Q) samples to a central base station. On the downlink, the base stations in the CoMP set jointly process the signal-to-leakage ratio (SLR) beamforming into the communication channel including the minimum mean square equalization (MMSE). On the uplink side, precoding is performed onto the channel again with MMSE equalization for the SLR beamforming.

In general, within the downlink CoMP operations (FIG. 4A), a base station, such as base station 105*a*, chooses UEs, such as UE 115*a*, to schedule and requests SRS feedback ("pre-grant"). UE 115*a* transmits SRS in addition to DMRS and the CSF within the PUCCH of downlink CoMP header 401. Base station 105*a* determines the SLR beams and modulation coding scheme (MCS) based on the SRS. Downlink beamformed data 402 includes downlink transmissions of control/data (e.g., CRS, downlink grants in the PDCCH, DMRS, PDSCH), which are transmitted via SLR-beamforming. At the end of downlink CoMP beamformed data 402, base station 105*a* receives uplink acknowledgement via the DMRS and PUCCH, which are received via MMSE (SLR) equalization.

Within the uplink CoMP operations (FIG. 4B), base station chooses to schedule UE 115*a* and requests SRS feedback ("pre-grant") within uplink CoMP header 404. UE 115*a* transmits SRS for the "pre-grant ACK" in uplink CoMP header 400, after which base station 105*a* determines the SLR beams and MCS. Downlink controls, such as CRS, uplink grants, and the like, may also be transmitted via SLR-beamforming. After uplink CoMP header 404, the data are received in uplink CoMP beamformed data 405 with DMRS and PUSCH via MMSE (SLR) equalization.

CoMP performance is mainly limited by channel accuracy at the base station as it affects beam selection. For each transmission opportunity, a phase synchronization is performed in the beginning of the transmission opportunity. However, a single phase synchronization per transmission opportunity may not be sufficient when the phase drift within the transmission opportunity is non-negligible. Because CoMP operations rely on the interoperations between multiple base stations, the phase coherence is much more strict as compared to single point processing. Non-negligible phase drift over the transmission opportunity can greatly degrade the CoMP performance. Accordingly, solutions have been suggested that provide a phase compensation reference signal (PCSR) that may be transmitted when the phase drift exceeds a predetermined threshold. The PCRS allows the base station or other transmitting node to compensate for the phase drift.

In general, CoMP joint transmission operations take advantage of the channel reciprocity that exists between the uplink and downlink channels. Accordingly, CoMP operations use very accurate gain and phase control. Calibration operations are used to counter gain/phase mismatches that arises between the transmit and receive operations. However, calibration operations are typically performed infrequently (e.g., every 1 minute, 1 hour, 1 day etc.). Phase synchronization may occur across multiple base stations. The clocks of each of the base stations may have different jitter, such that at each listen before talk (LBT) opportunity, a different base station may reflect a different phase. For purposes of this application an assumption will be made that the calibration has already been performed. The various aspects of the present disclosure will address the phase synchronization problem across base stations at each LBT.

It should be noted that that the CoMP techniques can be applied equally to licensed, unlicensed, and shared spectrum operations, and the phase synchronization can be performed during each LBT opportunity, or may be performed once every X ms (or other time frame), where X depends on the required accuracy, as well as the actual implementation.

Despite the calibration (which calibrates the gain and phase), the phases at different base stations may drift over time. This could be due to the relative timing drift among base stations because of clock drift, where the base stations are not GPS-connected. Even when base stations are GPS-connected, there may be a random phase drift at each base station based on the dynamics the electronic components, such as phase locked loops (PLLs). Therefore, phase synchronization should be performed regularly in order to achieve a short term co-phasing of base stations. Like calibration, phase synchronization can be performed over-the-air in a UE-assisted or Inter-base station operation.

Figure 5:
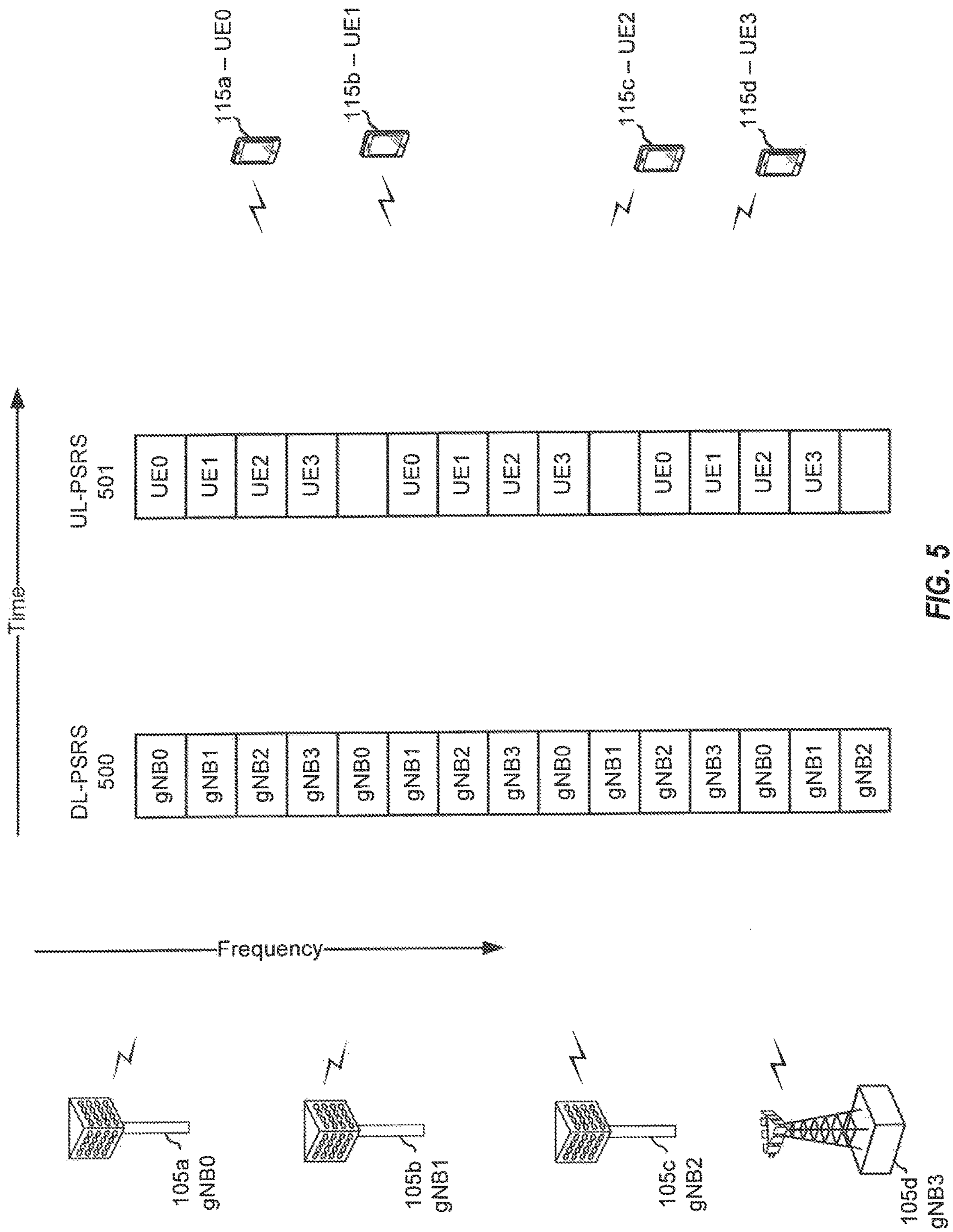
FIG. 5 is a block diagram illustrating base stations and UE implementing a UE-assisted phase synchronization operation.

FIG. 5 is a block diagram illustrating base stations 105*a*-105*d* and UEs 115*a*-115*d* implementing a UE-assisted phase synchronization operation. For UE-assisted techniques, one downlink PSRS (DL-PSRS 500) symbol and one uplink PSRS (UL-PSRS 501) symbol are used. DL-PSRS 500 from different base stations (base station 105*a*/gNB0—base station 105*d*/gNB3) may be multiplexed, while UL-PSRS 501 from different UEs (UE 115*a*/UE0—UE 115*d*/UE3) may also be multiplexed, in such a way that all the base station-UE pairs are accounted for. For example, the first tone, base station 105*a*/gNB0 sends DL-PSRS 500 tone. UE 115*a*/UE0 sends UL-PSRS 501 tone modulated by the estimated downlink channel from base station 105*a*/gNB0. Base station 105*a*/gNB0 may then determine both the uplink channel estimation and downlink channel estimation from UE 115*a*/UE0 from the same tone.

It should be noted that different DL-PSRS and UL-PSRS patterns can be designed to satisfy the phase drift requirement.

For UE-assisted techniques, UL-PSRS 501 is modulated with a function of the downlink channel estimation. Modulating UL-PSRS 501 with the downlink channel estimate removes the phase of the uplink/downlink channel, but leaves the phase and timing drift. This is true both for the first option in which UL-PSRS 501 is modulated with the conjugation of the normalized downlink channel estimation, and the second option, in which UL-PSRS 501 is modulated with the negative of the phase of the downlink channel estimation.

Various aspects of the present disclosure provide for modulating the DL-PSRS, as a precoded CSI-RS, instead of the UL-PSRS. While modulation of the UL-PSRS with a function of the downlink channel estimation can effectively remove the phase information in downlink/uplink channel itself and leave the phase and timing drift estimation of the UL-PSRS, the modulated UL-PSRS is subject to a high peak to average power ratio (PAPR). For edge UEs, the high PAPR requirement may make it impractical to transmit UL-PSRS. As such, various aspects provide for the UE to transmit SRS, while multiple base stations measure the uplink channel from the SRS transmission. The base stations will each then transmit DL-PSRS, modulated with a form of the uplink channel estimation. The DL-PSRS can be treated as precoded CSI-RS. The UE will then measure the phase and timing drift across the multiple base stations from the received DL-PSRS from each base station. The UE would then report the estimated phase and timing drift to each base station.

Figure 6A:
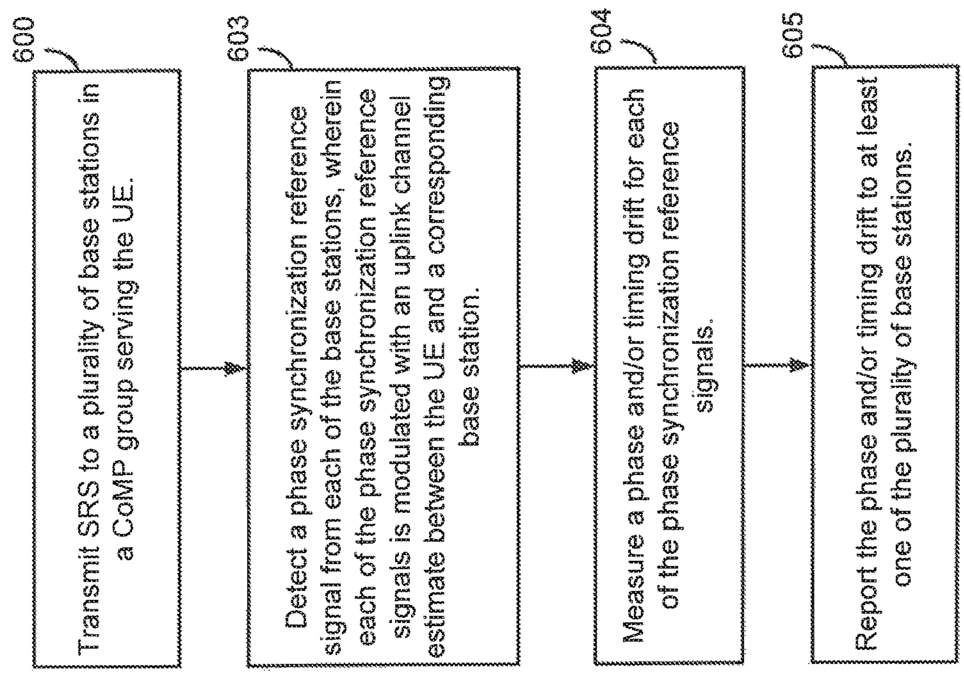
FIGS. 6A and 6B are block diagrams illustrating example blocks executed to implement aspects of the present disclosure.
Figure 6B:
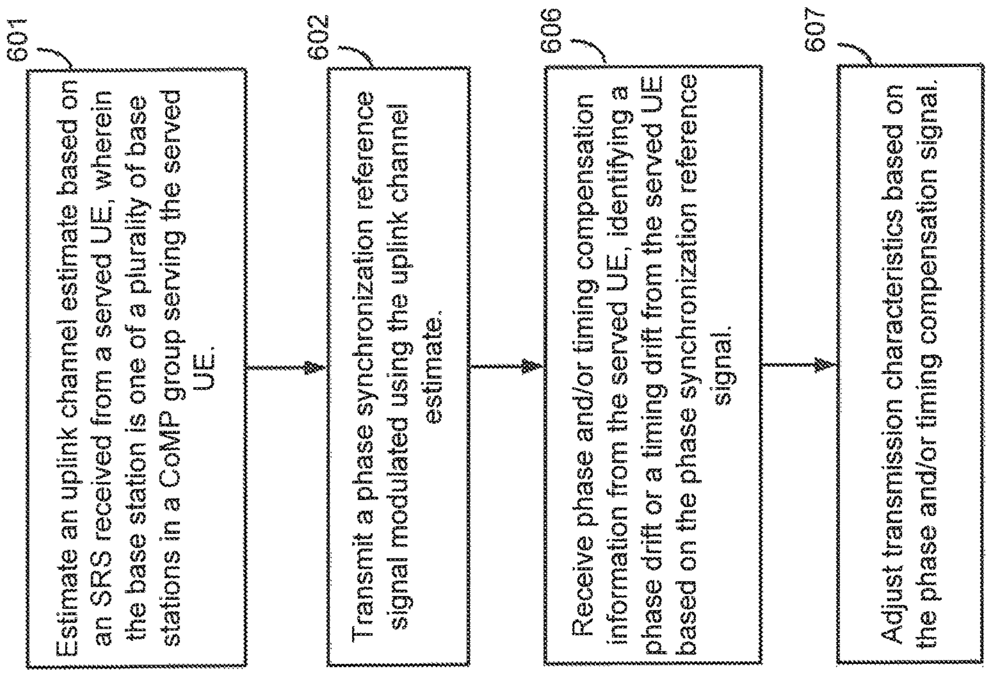
Figure 9:
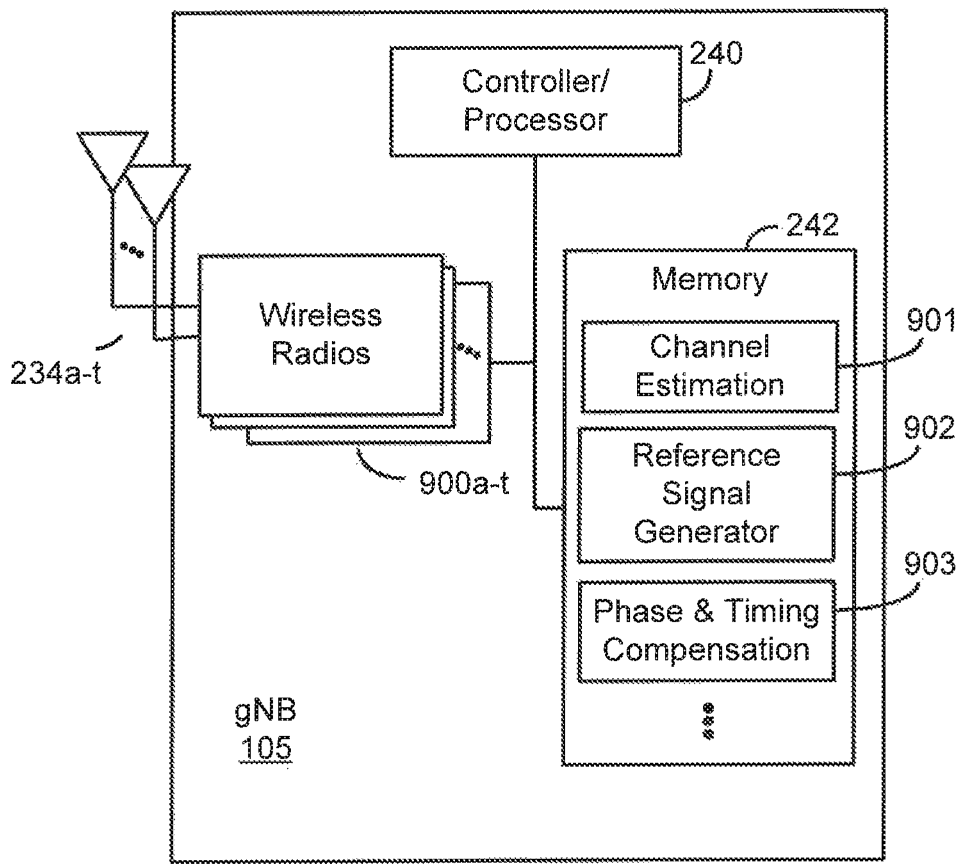
FIG. 9 is a block diagram illustrating an eNB configured according to one aspect of the present disclosure.

FIGS. 6A and 6B are block diagrams illustrating example blocks executed to implement aspects of the present disclosure. The example blocks will also be described with respect to gNB 105 as illustrated in FIG. 9. FIG. 9 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 900*a-t* and antennas 234*a-t*. Wireless radios 900*a-t* includes various components and hardware, as illustrated in FIG. 2 for gNB 105, including modulator/demodulators 232*a-t*, MIMO detector 236, receive processor 238, transmit processor 220, and TX MIMO processor 230.

Figure 10:
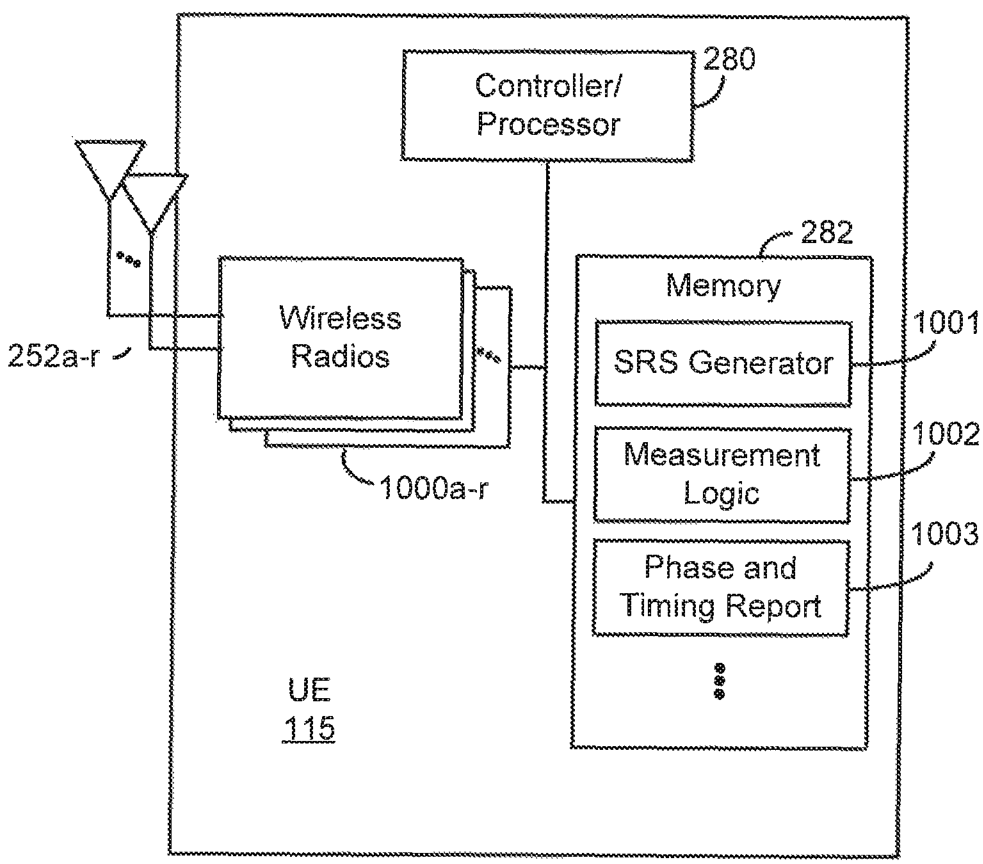
FIG. 10 is a block diagram illustrating a UE configured according to one aspect of the present disclosure.

The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via normal-performance radios 1000*a-i*, low-complexity radios 1000*j-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266.

FIG. 6A identifies the example blocks executed by a UE configured according to one aspect of the present disclosure, and FIG. 6B identifies the example blocks executed by a base station configured according to one aspect of the present disclosure. At block 600, a UE transmits SRS to a plurality of base stations in a CoMP group serving the UE. For example UE 115, under control of controller/processor 280, executes SRS generator 1001, stored in memory 282. The execution causes an SRS to be transmitted from UE 115 via wireless radios 1000*a-r* and antennas 252*a-r*. At block 601, each one of the base stations in the CoMP group estimates an uplink channel based on the SRS received or detected from the UE. For example, gNB 105 detects and receivers the SRS via antennas 234*a-t* and wireless radios 900*a-t*. gNB 105, under control of controller/processor 240, executes channel estimation logic 901, stored in memory 242. The execution environment of channel estimation logic 901 estimates the uplink channel between gNB 105 and the particular UE from which the SRS was received. The uplink channel estimated is the uplink channel between each individual base station and the UE transmitting the SRS.

At block 602, each base station of the CoMP group transmits a PSRS that is modulated using a form of the uplink channel estimate. gNB 105, under control of controller/processor 240, executes reference signal generator 902, stored in memory 242. gNB 105 will modulate the reference signal, such as a PSRS, using the uplink channel estimate determined from block 601. For example, the PSRS may be modulated with the conjugate of the normalized uplink channel estimate or with the negative conjugate of the phase of the uplink channel estimate. gNB 105 would then transmit the modulated PSRS via wireless radios 900*a-t* and antennas 234*a-t*. At block 603, the UE detects the PSRS from each of the base stations in the CoMP group, wherein the detected PSRS is modulated with the uplink channel estimate between the UE and the corresponding base station. For example, UE 115 receives the PSRS via antennas 252*a-r* and wireless radios 1000*a-r*. At block 604, the UE measures the phase drift for each of the PSRS. UE 115, under control of controller/processor 280, executes measurement logic 1002, stored in memory 282. The execution environment of measurement logic 1002 allows UE 115 to measure the phase and/or timing drift in the modulated PSRS. As noted above, the modulation of the downlink PSRS leaves the phase and timing drift in the signal. Thus, UE 115 may measure both the phase and timing drift.

At block 605, the UE reports the measured phase drift and/or timing drift to at least one of the plurality of base stations. For example, UE 115, under control of controller/processor 280, executes phase and timing report logic 1003, stored in memory 282. The execution environment of phase and timing report logic 1003 allows for UE 115 to prepare compensation information to be reported to each of the base stations in the CoMP group. The report is transmitted from UE 115 via wireless radios 1000*a-r* and antennas 252*a-r*. All of the base stations of the CoMP group may not be involved in modifying communications in order to compensate for the phase and timing drift. Accordingly, the UE may send to all of the base stations of the CoMP group, a subset of those base stations, or even a single base station of the CoMP group. Such reports may be sent in various signals to the base station, such as via PUCCH. At block 606, the base station(s) to which the UE has sent the report of the phase and/or timing drift receives phase and/or timing compensation information from the served UE, identifying a phase drift or a timing drift from the UE based on the PSRS. For example, gNB 105 receives the reported phase and/or timing compensation information via antennas 234*a-t* and wireless radios 900*a-t*. At block 607, the base station(s) adjusts transmission characteristics based on the UE report. For example, gNB 105 executes phase and timing compensation 903, using the phase and timing compensation information received from the UE. Using this reported phase and/or timing compensation information from the UE, gNB 105 may adjust and synchronize the phase and timing of communications between the CoMP group.

Figure 7:
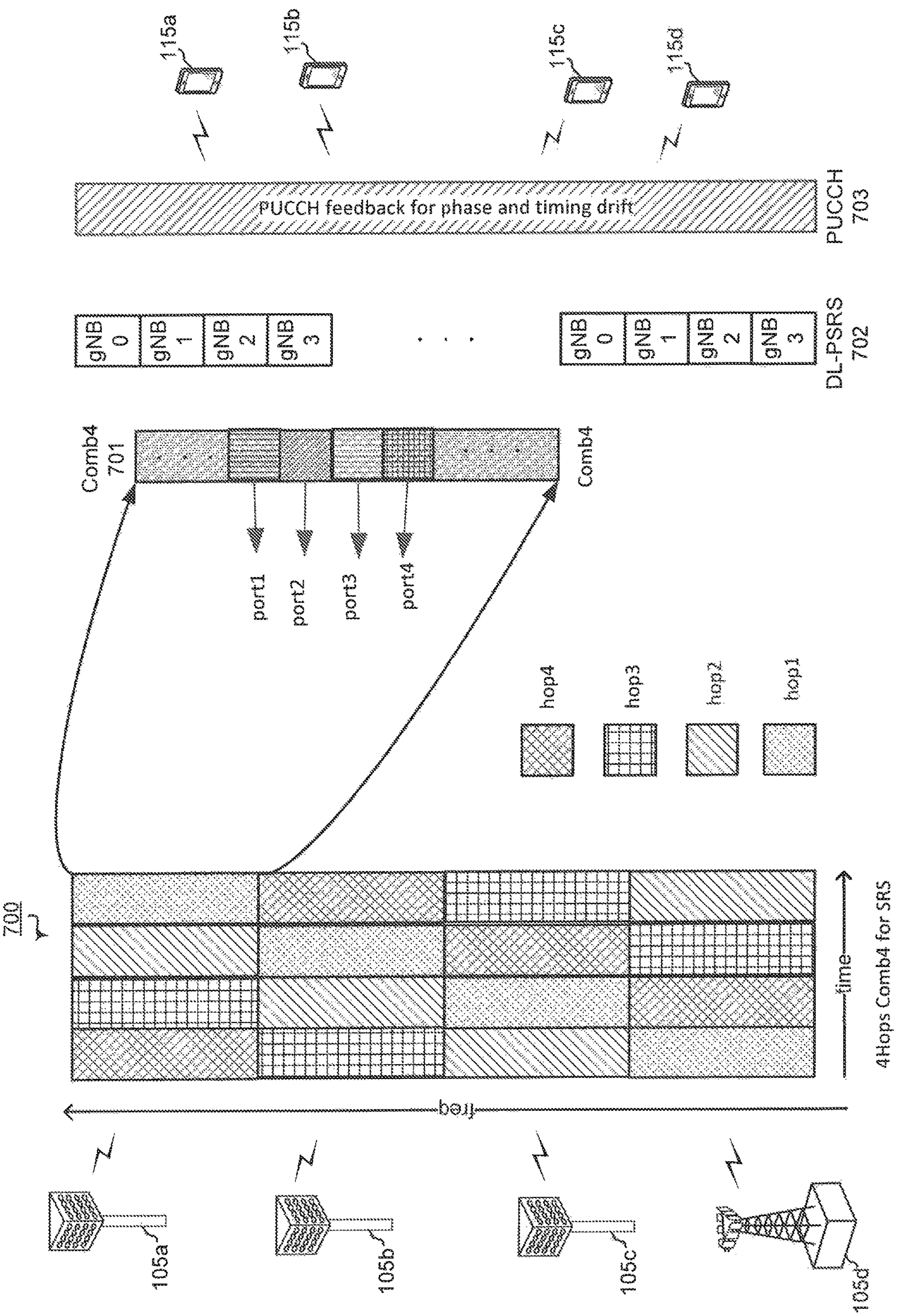
FIG. 7 is a block diagram illustrating base stations and UEs configured according to one aspect of the present disclosure.

FIG. 7 is a block diagram illustrating base stations 105*a*-105*d* and UEs 115*a*-115*d* configured according to one aspect of the present disclosure. As illustrated, the SRS supports 16 orthogonal ports. Thus, four UEs (UEs 115*a*-115*d*) may be covered with four ports per UE. According to the example illustrated, phase synchronization operation 700 uses a comb 4 with a hopping 4 in four symbols. Within each such comb, such as comb 4 701, the four ports allow for each of UEs 115*a*-115*d* to transmit SRS. Multiple gNBs, such as base stations 105*a*-105*d*, measure the SRS channel. Base stations 105*a*-105*d* send DL-PSRS 702 modulated with the uplink channel estimate in orthogonal resources. The UEs, such as UEs 115*a*-115*d*, may then measure the phase and timing drift based on DL-PSRS 702 and report the phase and/or timing compensation information back to one or more of base stations 105*a*-105*d* via PUCCH 703.

It should be noted that for phase synchronization, the UE may not use all four ports for each transmit antenna. FIG. 7 is merely one example implementation of the described aspect. In some aspects, the UE may send SRS to estimate the downlink or uplink channel from each transmit port. The base station may further use the SRS transmission for both channel estimation as well as the phase synchronization.

Figure 8:
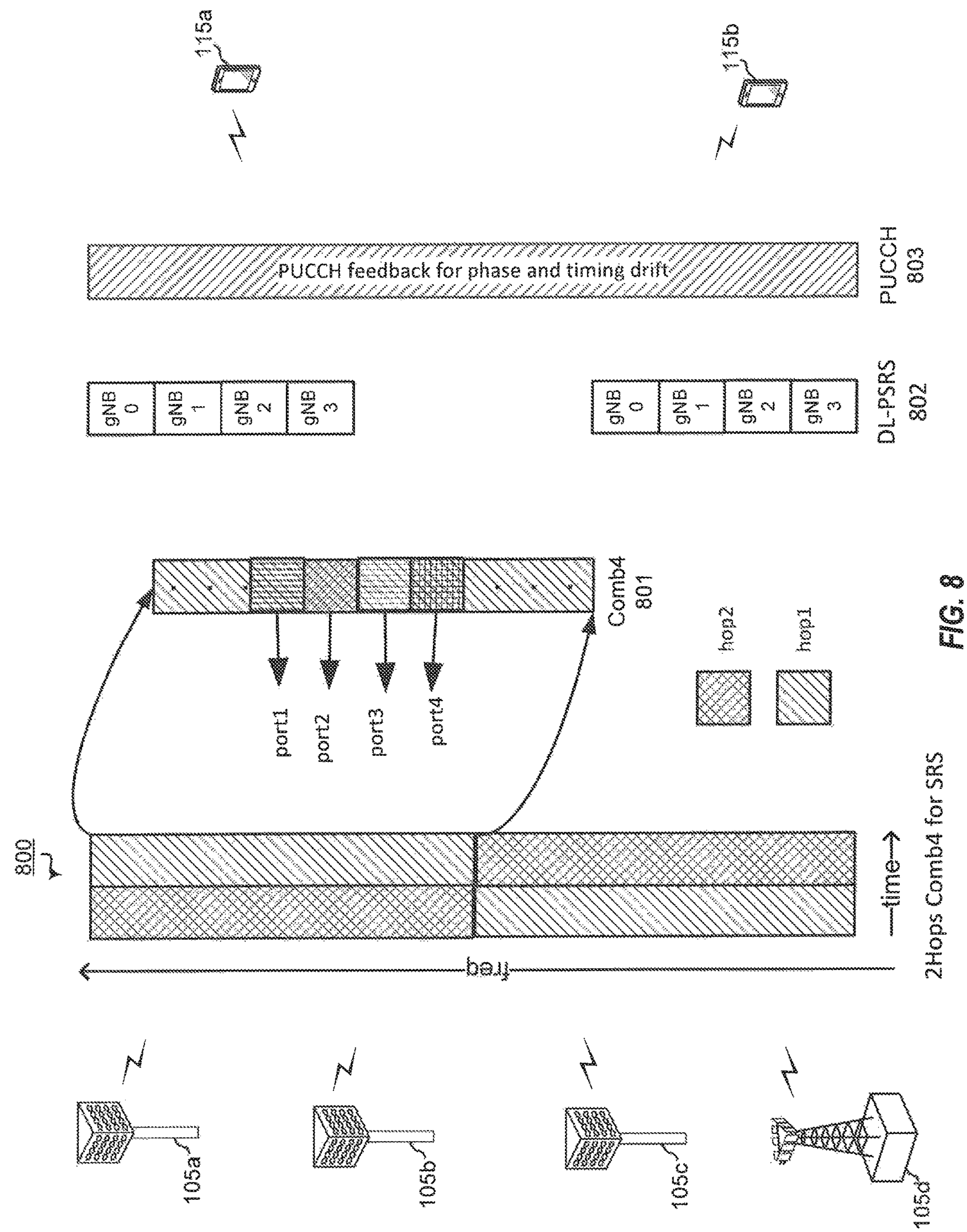
FIG. 8 is a block diagram illustrating base stations and UEs configured according to one aspect of the present disclosure.

FIG. 8 is a block diagram illustrating base stations 105*a*-105*d* and UEs 115*a*-115*b* configured according to one aspect of the present disclosure. As illustrated, the SRS supports 8 orthogonal ports. Thus, two UEs (UEs 115*a*-115*b*) may be covered with four ports per UE. According to the example illustrated, phase synchronization operation 800 uses a comb 4 with a hopping 2 in two symbols. Within each comb, such as comb 4 801, the four ports allow for each of UEs 115*a*-115*b* to transmit SRS. Base stations 105*a*-105*b* measure the SRS channel. Base stations 105*a*-105*d* send DL-PSRS 802 modulated with the uplink channel estimate in orthogonal resources. UEs 115*a*-115*b* may then measure the phase and timing drift based on DL-PSRS 802 and report the phase compensation information back to one or more of base stations 105*a*-105*d* via PUCCH 803.

As previously noted, for phase synchronization, the UE may not use all four ports for each transmit antenna. FIG. 8 is also merely one example implementation of the described aspect. As indicated with regard to FIG. 7, in additional aspects, the UE may send SRS to estimate the downlink or uplink channel from each transmit port, while the base station may use the SRS transmission for both channel estimation and phase synchronization.

It should be noted that, a base station with multiple transmit antennas may increase power gain by transmitting the PSRS over the multiple antennas using FDM. By FDM transmission over the multiple antennas, an antenna diversity may also be obtained in the PSRS transmission. Another example aspect provides for multiple transmit antennas from the same base station to modulate with the corresponding downlink channel and transmit the DL-PSRS on the same resources. The measured phase and timing drift would be the same over the multiple transmit antennas on the same base station. Thus, the improved power gain and antenna diversity would not negatively affect the phase compensation information provided by the UE measuring the PSRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A and 6B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:

transmitting, by a user equipment (UE), sound reference signals (SRS) to a plurality of base stations in a coordinated multipoint (CoMP) group serving the UE;

detecting, at the UE, a phase synchronization reference signal from each of the plurality of base stations, wherein each of the phase synchronization reference signals is modulated with an uplink channel estimate between the UE and a corresponding base station of the plurality of base stations;

measuring, by the UE, a phase drift for each of the phase synchronization reference signals; and reporting, by the UE, the phase drift to at least one of the plurality of base stations.

2. The method of claim 1, further including:

receiving, by the UE from at least one of the plurality of base stations, a helper UE designation, wherein the helper UE designation identifies the UE to perform the measuring and the reporting.

3. The method of claim 2, wherein the receiving the helper UE designation is performed one of: semi-statically, or dynamically.

4. The method of claim 1, wherein the phase synchronization reference signal is modulated according to one of:

a conjugate of a normalized version of the uplink channel estimate; or a negative of a phase of the uplink channel estimate.

5. An apparatus configured for wireless communication, the apparatus comprising:

at least one processor; and a memory coupled to the at least one processor, wherein the at least one processor is configured:

to transmit, by a user equipment (UE), sound reference signals (SRS) to a plurality of base stations in a coordinated multipoint (CoMP) group serving the UE;

to detect, at the UE, a phase synchronization reference signal from each of the plurality of base stations, wherein each of the phase synchronization reference signals is modulated with an uplink channel estimate between the UE and a corresponding base station of the plurality of base stations;

to measure, by the UE, a phase drift for each of the phase synchronization reference signals; and to report, by the UE, the phase drift to at least one of the plurality of base stations.

6. The apparatus of claim 5, further including configuration of the at least one processor to receive, by the UE from at least one of the plurality of base stations, a helper UE designation, wherein the helper UE designation identifies the UE to execute the configuration to measure and the configuration to report.

7. The apparatus of claim 6, wherein the configuration of the at least one processor to receive the helper UE designation is executed one of: semi-statically, or dynamically.

8. The apparatus of claim 5, wherein the phase synchronization reference signal is modulated according to one of:

a conjugate of a normalized version of the uplink channel estimate; or a negative of a phase of the uplink channel estimate.

* * * * *